April 5, 1960     S. VERNET     2,931,390
POWER TRANSLATING DEVICE HAVING AN ANTI-EXTRUSION DISC
Filed April 11, 1956
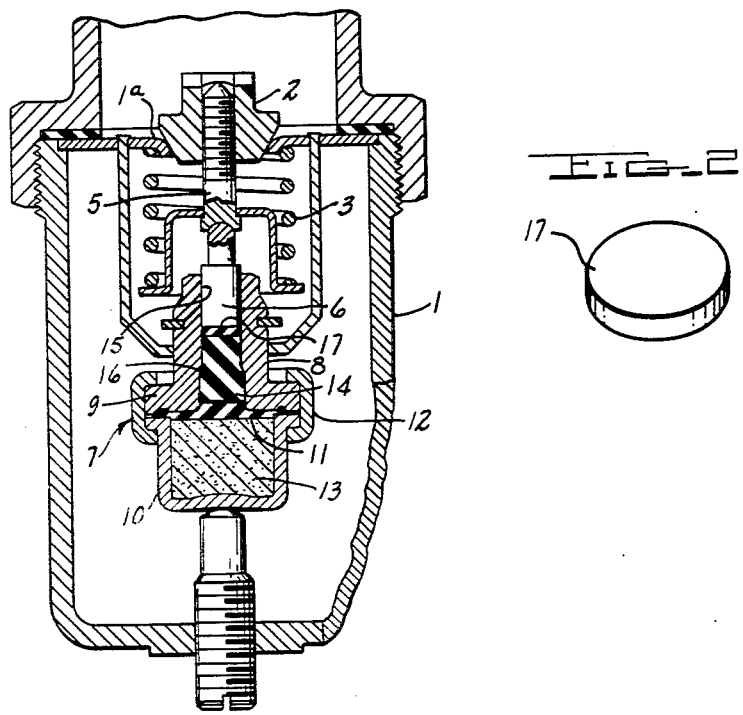
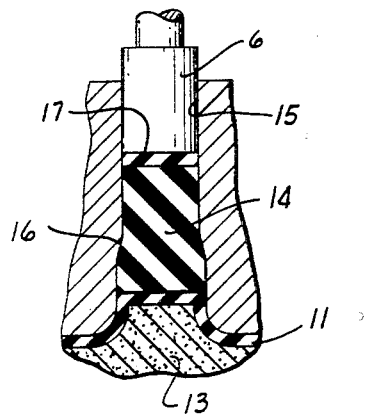
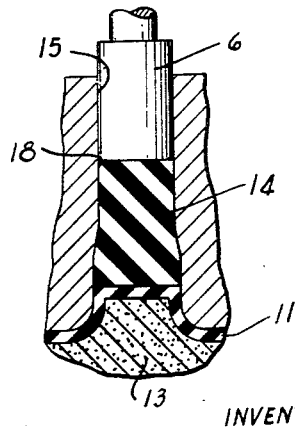
INVENTOR
SERGIUS VERNET
BY *Smith, Olsen, Lewis & McRae*
ATTORNEYS

United States Patent Office 2,931,390
Patented Apr. 5, 1960

2,931,390

POWER TRANSLATING DEVICE HAVING AN ANTI-EXTRUSION DISC

Sergius Vernet, Yellow Springs, Ohio, assignor to Antioch College, Yellow Springs, Ohio, a corporation of Ohio Application April 11, 1956, Serial No. 577,580

6 Claims. (Cl. 137—789)

This invention relates to new and useful improvements in devices for transmitting force and movement through a reciprocal thrust member.

In force transmitting devices having a guided thrust member reciprocal in a guide bore which is sealed by a pliable elastic movement transmitting plug member, there is a tendency for the peripheral edge portion of the plug member to chafe or to extrude at its peripheral and engagement with the thrust member and for the chafes or extruded portion to pass into the clearance space between the thrust member and the wall of its guide bore. This break-down or extrusion of the sealing plug is a deleterious action and renders the device inefficient in operation. The object of this invention is, therefore, to provide means which will oppose the chafing or extrusion of the sealing plug.

In the accompanying drawings, to be taken as a part of this specification, there is fully and clearly illustrated a preferred embodiment of the invention, in which drawings:

Figure 1 is a view in vertical central section through a thermostatically operated valve device having force transmitting means embodying the invention;

Figure 2 is an enlarged detail view in perspective of the chafe or extrusion opposing disc or element of the invention;

Figure 3 is an enlarged detail view in vertical central section showing a position of the force transmitting means and its parts after movement; and Figure 4 is a view similar to Figure 3 of a force transmitting means without this invention and therefore subject to chafing or extrusion.

Referring to the drawings by characters of reference, 1 designates a valve housing or casing such as that of a thermostat valve for controlling flow of engine-cooling liquid. Within the casing there is a partition 1ᵃ having a valve port controlled by a reciprocal valve member 2 urged to its seat by a spring 3 resting on an abutment member 4 carried by the valve stem 5. Axially aligned with and engaging the stem 5 is the thrust member or reciprocal plunger 6 of the thermostatic power element 7 which includes a metal guide member 8 with a base or end flange 9. The element 7 also includes a metal cup 10 which is closed by the flange 9. A sealing diaphragm 11 of pliable elastic material, is clamped at its periphery between the flange 9 and top edge of the cup 10, a clamping ring 12 being employed for this purpose. It may be noted that the diaphragm is squeezed adjacent its periphery into an annular recess in the flange 9 and that it has a marginal flash edge portion outward of the recess which further seals the joint. Within the cup 10 there is a temperature responsive material 13 the composition of which is such that the material has a high degree of expansion upon change of state in its operating range. The diaphragm transmits its expansive movement to a sealing plug 14 which fits the guide bore or passageway 15 within which the thrust member 6 reciprocates. The plug 14 is of pliable elastic material which seats on the diaphragm 11 and extends through a restricting throat 16 in the passageway 15. Interposed between the top end or face of the plug 14 and the lower face or end of the plunger 6, there is a low-friction and anti-chafing disc 17 of a plastic material, such as polytetrafluoroethylene, polyvinyl chloride, polymonochlorotrifluoroethylene, nylon, polyvinyl chloride acetate, polyvinylidene chloride, polyethylene, polymethylene and arcylonitrile resin. The disc 17 is preferably quite thin, say of a thickness of fifteen or fifty thousandths of an inch, as being sufficient for its anti-chafing and anti-extrusion purpose. The disc 17 is of a relatively hard plastic material having some resilience, so that it tightly fits the guideway 15, and as it has very low friction qualities, it will not chafe as it reciprocates in the guideway 15. The disc 17 also has some lubricating qualities, which may be increased by use of a lubricant, if necessary, so that the peripheral edge of the plug 14 abutting thereagainst will not stick and chafe in its guideway 15. Since the disc 17 is a very low friction material and has some lubricating qualities it acts as a lubricating guide on the end of the plunger 6. There is usually a slight extrusion of the disc 17 into the space around the plunger 6, but this is not harmful due to its low friction qualities and in fact provides a better seal of the plunger with its guide bore. Extrusion of the peripheral plug edge is overcome by the tight fit of the disc material in the guideway, the fit closing the clearance around the plunger 6.

In Figure 4, the omission of the disc 17 results in the peripheral edge of the plug 14 wearing away, as at 18, with the danger that the particles which sluff off may become lodged in the clearance space around the plunger 6, thus causing sticking and inefficient operation. In addition to the possibility of peripheral corner edge chafing, there is also danger that this corner edge will extrude into the clearance grace, thereby also causing sticking of the plunger 6 when the disc 17 is not used.

This is a continuation in part of application, Serial No. 280,093, now abandoned, filed on April 2, 1952.

Having thus described the invention, what is claimed and desired to be secured by Letters Patent of the United States is:

1. In a power translating device, a guide member having a guide passageway therein, a thrust member reciprocally fitting and having a close clearance in said passageway, a force transmitting plug of pliable elastic material fitting in and sealing said passageway and operable on movement to move said thrust member, and a thin low friction resilient plastic disc member sealing said passageway and interposed between said plug and said thrust member, said disc member directly engaging said thrust member and being radially compressed by said guide member and being of harder material than said plug so as to oppose extrusion of the plug into the clearance space between the thrust member and passageway, said disc member being composed of a plastic material selected from the group consisting of polytetrafluoroethylene polymonochlorotrifluoroethylene, nylon, polyvinyl chloride, polyvinyl chloride acetate, polyvinylidene chloride, polyethylene, and polymethylene.

2. The combination of claim 1 wherein said disc member is formed of polymonochlorotrifluoroethylene.

3. The combination of claim 1 wherein said disc member is formed of polyvinyl chloride.

4. The combination of claim 1 wherein said disc member is formed of nylon.

5. The combination of claim 1 wherein said disc member is formed of polyethylene.

6. The combination of claim 1 wherein said disc member is formed of polytetrafluoroethylene.

References Cited in the file of this patent

UNITED STATES PATENTS

| | | |
|---|---|---|
| 2,310,961 | Kropa | Feb. 16, 1943 |
| 2,459,739 | Groten et al. | Jan. 18, 1949 |
| 2,570,829 | Maxey et al. | Oct. 19, 1951 |
| 2,825,661 | Dosmann | Mar. 4, 1958 |

OTHER REFERENCES

Handbook of Plastics: Simonds, Weith, and Bigelow, 2nd edition, D. Van Nostrand Co., Inc., N.Y., January 1949, page 199.